(12) United States Patent
Buckland et al.

(10) Patent No.: US 6,278,933 B1
(45) Date of Patent: Aug. 21, 2001

(54) RAPID TRANSIENT TORQUE MANAGEMENT IN DISI ENGINES

(75) Inventors: Julia Helen Buckland, Dearborn; Jessy W. Grizzle, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/560,324

(22) Filed: Apr. 28, 2000

(51) Int. Cl.[7] .............................. F02D 41/02; F02B 3/04
(52) U.S. Cl. ............................................ 701/104; 123/305
(58) Field of Search .............................. 701/104; 123/305

(56) References Cited

U.S. PATENT DOCUMENTS

| 5,894,828 | 4/1999 | Sivashankar et al. . |
| 5,947,079 | 9/1999 | Sivashankar et al. . |
| 5,975,048 | 11/1999 | Sivashankar et al. . |
| 5,992,374 | 11/1999 | Morikawa . |
| 5,996,547 | 12/1999 | Machida et al. . |
| 6,055,476 | * 4/2000 | Yoshino ................................ 701/110 |
| 6,148,791 | * 11/2000 | Fujieda et al. ........................ 123/295 |
| 6,178,943 | * 1/2001 | Taga et al. ............................ 123/295 |

* cited by examiner

*Primary Examiner*—Andrew M. Dolinar
(74) *Attorney, Agent, or Firm*—John D. Russell

(57) ABSTRACT

A system and method for transient torque control of a direct injection spark ignition engine include controlling airflow and fuel flow rather than ignition timing so that spark timing may be set for best fuel economy. The system and method are particularly suited for variable cam timing or variable valve timing DISI engines where valve timing enables a sufficiently fast engine torque response to achieve transient control. The present invention may be used for torque-based speed control strategies, such as idle speed control or cruise control. The invention includes determining a maximum available airflow to determine whether a desired torque and air/fuel ratio can be achieved using airflow. Otherwise, the invention uses fuel flow control based on the maximum available air flow to provide the desired engine output torque and air/fuel ratio.

20 Claims, 3 Drawing Sheets

RAPID TRANSIENT TORQUE MANAGEMENT IN DISI ENGINES

TECHNICAL FIELD

The present invention relates to transient torque control systems and methods for direct injection spark ignition internal combustion engines.

BACKGROUND ART

Torque control systems for conventional port-injected engines are known in which the torque is generally adjusted by controlling ignition timing (spark), fuel quantity or timing, and/or airflow via the throttle plate. Because of the time delay associated with throttle-regulated airflow upstream of the cylinders, and because of the increased pumping losses associated with a throttled airflow, this parameter is generally undesirable or unsuitable for transient torque control. Spark is typically preferred for transient torque control because the engine output torque responds very quickly to changes in spark timing. Furthermore, spark has a broad range of authority over output torque, i.e. spark can be used to rapidly vary output torque to nearly zero, if desired. However, any departure of spark timing from the spark timing that gives maximum torque for a given amount of air and fuel (MBT) may result in a fuel economy penalty.

Transient torque control of conventional engines, whether using spark, air, or fuel, requires consideration of the effect on tailpipe emissions and associated emission control devices. Where three-way catalysts are used, air/fuel ratio must be tightly controlled near the stoichiometric ratio to prevent premature reduction of the catalyst conversion efficiency. Likewise, proper emissions control is more easily achieved by maintaining appropriate catalyst operating temperatures.

Many of the transient torque control strategies used in conventional IC engines have been adapted for use in direct fuel-injected spark-ignition engines, otherwise known as DISI engines. While these strategies may provide acceptable performance for many applications, they do not take advantage of the potential for improved efficiency afforded by differences in operating principles for DISI engines, and in particular lean burn DISI engines. Furthermore, some conventional control strategies are not applicable to DISI engines due to the differences in operation. As such, it would be desirable to provide a system and method for rapid transient torque control of various DISI engine configurations and operating modes which may result in improved engine efficiency and fuel economy.

SUMMARY OF THE INVENTION

An object of the present invention is to provide a system and method for transient torque control in a DISI engine using the fuel flow and/or air flow as transient torque actuators rather than spark.

In carrying out the above object and other objects, advantages, and features of the present invention, a system and method for transient torque control on a direct injection spark ignition internal combustion engine include determining a desired value for engine torque and air/fuel ratio based on current engine operating conditions. The system and method determine air flow bounds for currently available cylinder air flow based on current engine operating conditions and determine desired fuel flow and air flow values with minimum deviation from MBT spark timing to obtain the desired engine torque value and desired air/fuel ratio. The invention includes controlling at least one actuator without substantially altering spark timing to deliver the desired cylinder air flow if the desired cylinder air flow is less than the upper bound, and setting the desired cylinder air flow to the upper bound if the desired cylinder airflow exceeds the upper bound. When the upper bound is exceeded, the maximum airflow value is then used to determine an appropriate fuel flow based on the desired output torque and air/fuel ratio.

The methods and systems for transient torque control according to the present invention are particularly suited for DISI engines having variable valve timing or variable cam timing, but may be used in any throttled or unthrottled DISI engines, including lean burn DISI engines.

The present invention provides a number of advantages over prior art control strategies. For example, the present invention recognizes that for lean burn DISI engines, fuel as well as spark can be used for transient torque control since the restrictions on air/fuel ratio are reduced. In addition, for applications where variable control of the engine valves is possible, flue flow, air flow and spark have approximately equal response times for controlling engine output torque. Because moving spark away from MBT may result in fuel economy penalties, the present invention preferably uses fuel flow, and may use air flow if necessary, to provide transient torque control without substantially impacting ignition timing. The transient torque control may be used for speed control, such as idle speed control or cruise control by determining a desired torque to maintain a particular desired engine speed or vehicle speed.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
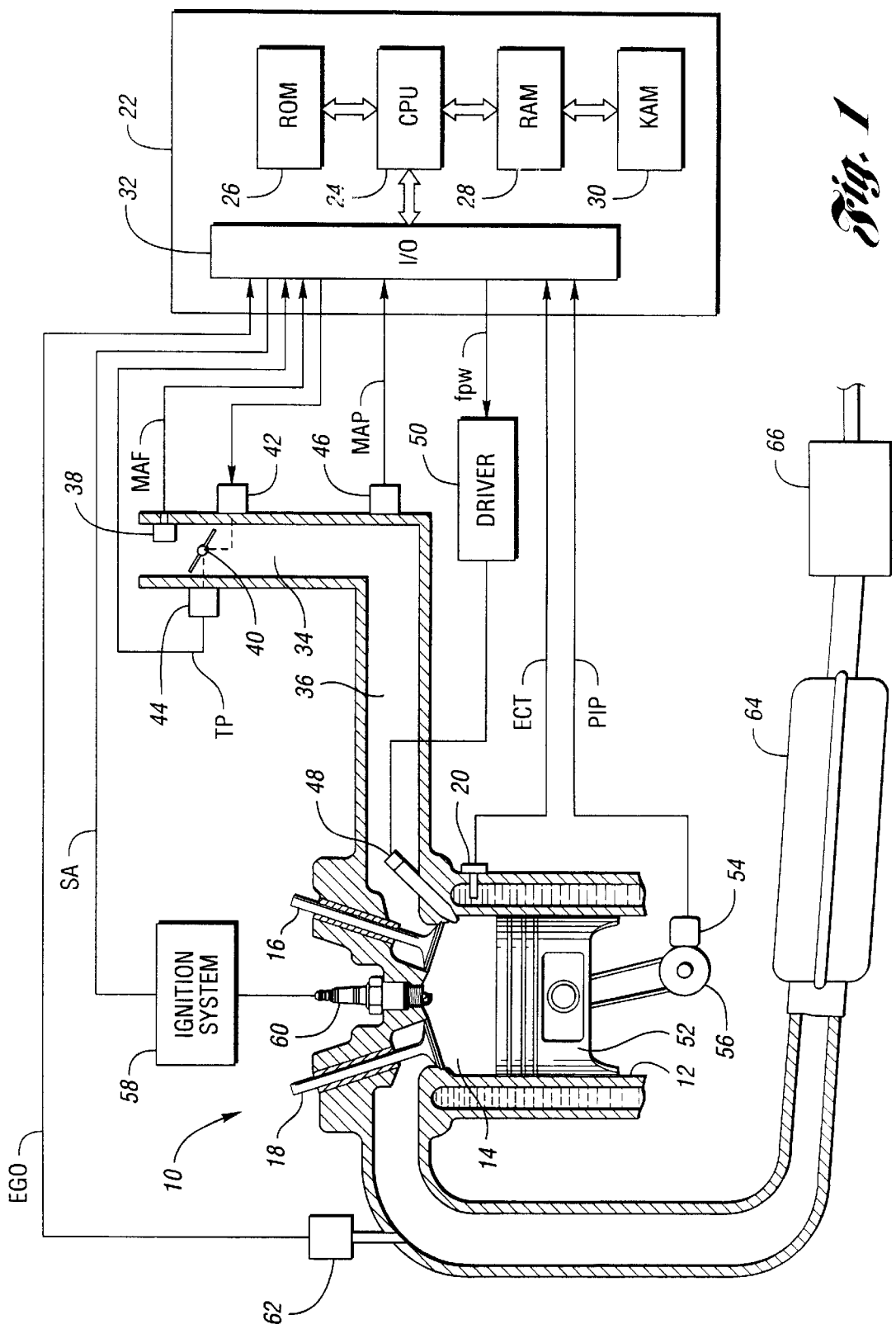
FIG. 1 is a block diagram illustrating an engine control system for a DISI engine according to the present invention.

A block diagram illustrating an engine control system for a DISI engine according to the present invention is shown in FIG. 1. System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18, while only including a single engine coolant temperature sensor 20.

In one embodiment, the present invention includes a mechanical variable cam timing device of conventional design used to alter the timing of intake valves 16 and/or exhaust valves 18 to provide air flow control. In an alternative embodiment, intake valves 16 and/or exhaust valves 18 are controlled by variable valve timing actuators, such as electromagnetic actuators, as known in the art.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, optical, or combination memory device capable of storing data, some of which represents executable instructions, used by microprocessor 24 in controlling the engine. Microprocessor 24 communicates with the various sensors and actuators via an input/output (I/O) interface 32.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. In some embodiments of the present invention, a throttle valve 40 is used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As will be appreciated by those of ordinary skill in the art, the present invention is particularly suited for use in unthrottled or throttleless DISI engines where air flow may be controlled using appropriate valve timing. Whether or not the engine includes a physical throttle, such as throttle valve 40, the engine may be operated in various unthrottled modes. Such operation reduces pumping losses and increases engine efficiency which may result in improved fuel economy. Throttleless engines may include those having variable valve timing (VVT) where intake and exhaust valves are controlled electronically using electromagnetic actuators rather than a conventional cam arrangement. Likewise, engines having variable cam timing mechanisms may be operated at wide open throttle to reduce pumping losses with air flow control provided by modifying the cam timing. The present invention is also applicable to DISI engine configurations with conventional valve timing mechanisms which may also operate at wide open throttle in various modes, such as when operating in a lean burn or stratified mode.

As illustrated in FIG. 1, a manifold absolute pressure sensor 46 is used to provide a signal (MAP) indicative of the manifold pressure to controller 22. Air passing through intake manifold 36 enters combustion chamber 14 through appropriate control of one or more intake valves 16. As described above, intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 and processed by driver 50.

As illustrated in FIG. 1, fuel injector 48 injects an appropriate quantity of fuel in one or more injections directly into combustion chamber 14. Control of the fuel injection events is generally based on the position of piston 52 within cylinder 12. Position information is acquired by an appropriate sensor 54 which provides a position signal (PIP) indicative of rotational position of crankshaft 56.

According to the present invention, the torque and air/fuel ratio may be determined based on current operating conditions to obtain a desired value of air flow and a desired value of fuel flow. Preferably, the desired air flow is controlled during transient torque control using signals generated by controller 22 to control the intake valves 16 for variable valve timing or variable cam timing, as described in greater detail with reference to FIGS. 2 and 3. In throttled applications, air flow may be controlled using the throttle valve in combination with control of valve timing for intake and/or exhaust valves.

The desired fuel flow is achieved during transient torque control by appropriate signals generated by controller 22 for fuel injectors 48 to inject an appropriate quantity of fuel in one or more injections directly into each combustion chamber 14. At the appropriate time during the combustion cycle, controller 22 generates a spark signal (SA) which is processed by ignition system 58 to control spark plug 60 and initiate combustion within chamber 14. Preferably, spark is maintained at MBT, i.e. the timing that produces maximum torque for a given amount of air and fuel, whenever possible because these conditions generally result in better fuel economy. According to the present invention, spark or ignition timing is not substantially modified during transient torque control. Because fuel, spark and in some applications, air are equally fast in terms of output torque control response, the present invention uses fuel flow and/or air flow as transient torque actuators rather than spark.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders. The exhaust gas is passed through the exhaust manifold and through a catalytic converter 64 and $NO_x$ trap 66 before being exhausted to atmosphere.

As known, direct injection spark ignition engines such as illustrated in FIG. 1 may generally be operated in at least two modes of operation. To maintain stable combustion, the air/fuel ratio should be controlled within a first range for the stratified mode of operation and a second range for stable combustion in the homogeneous mode of operation. The specific air/fuel ranges may vary depending upon the particular application. As one example, stable combustion in the stratified mode may require air/fuel ratios between about 25:1 and about 40:1 while stable combustion in the homogeneous mode may require air/fuel ratios between about 12:1 and 20:1. Depending upon the particular engine configuration, various other operating modes with corresponding air/fuel ratios may also be used.

Figure 2:
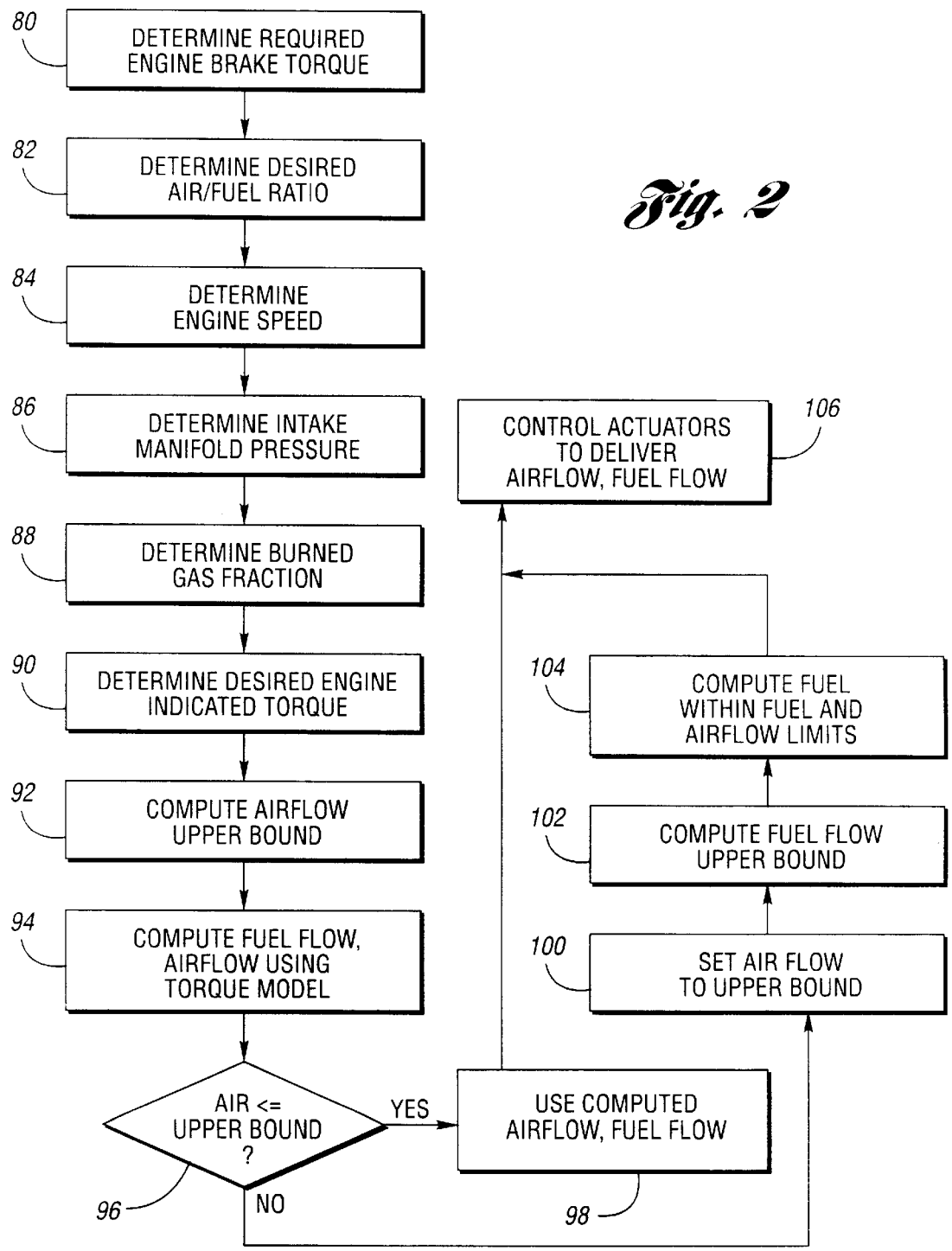
FIG. 2 is a diagram illustrating operation of a system and/or method for transient torque control in a DISI engine according to the present invention.

A diagram illustrating operation for a system and method for transient control in a DISI engine is shown in FIG. 2. The diagram of FIG. 2 represents control logic of one embodiment of a system or method according to the present invention. As will be appreciated by one of ordinary skill in the art, the diagram of FIG. 2 may represent any one or more of a number of known processing strategies such as eventdriven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Figure 3:
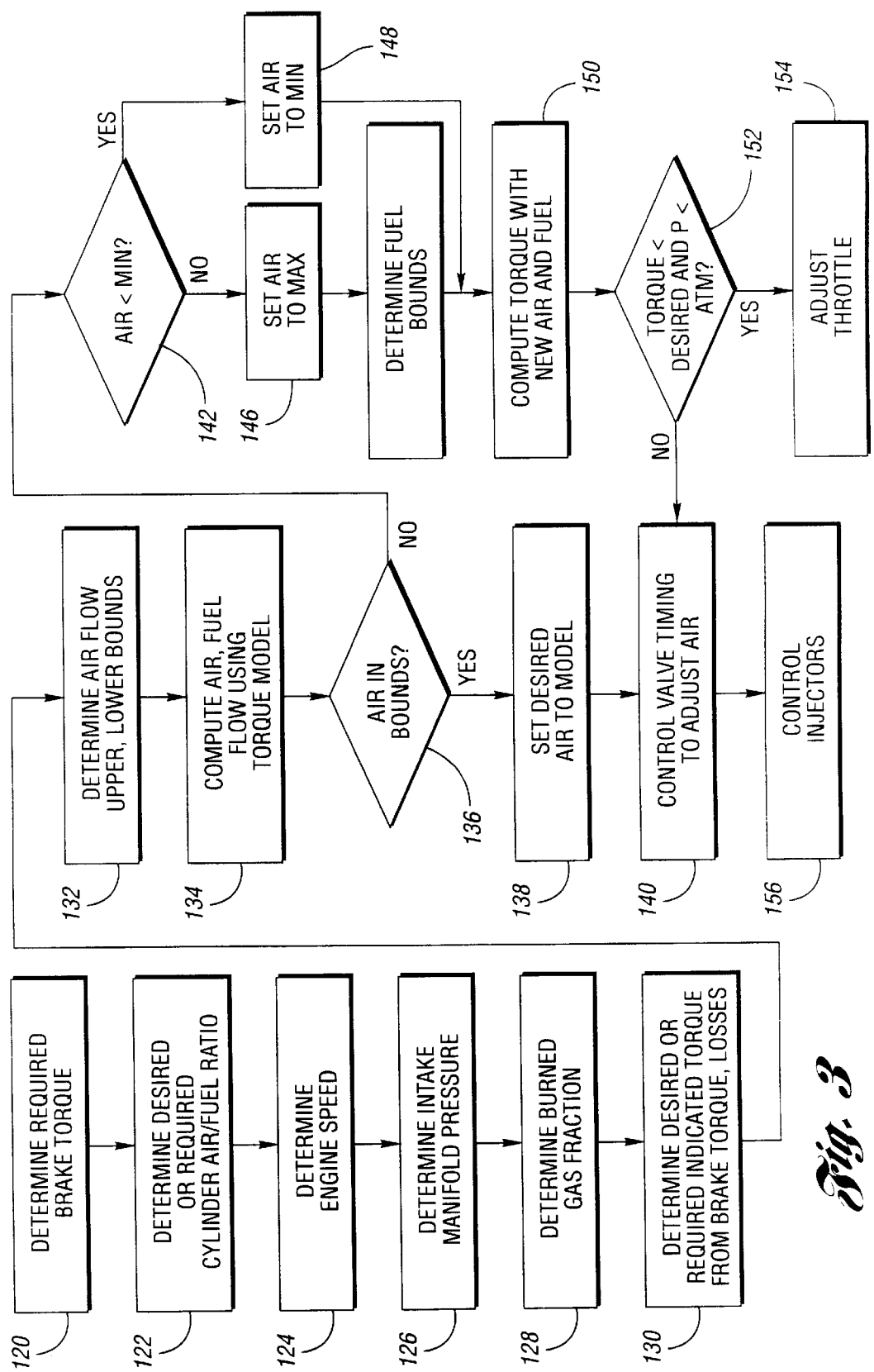
FIG. 3 is a diagram illustrating operation of a system and/or method for transient torque control in a DISI engine having variable cam timing according to the present invention.

Preferably, the control logic illustrated in FIGS. 2 and 3 is implemented in software which is executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

In the embodiment of FIG. 2, block 80 represents determination of the required engine brake torque. The required brake torque may be determined based on operator input, such as accelerator pedal position, and current engine operating conditions. For example, for speed control applications, such as idle speed control and vehicle speed (cruise) control, the required engine brake torque may be determined based on a speed error between a desired and actual speed. For these applications, the required engine brake torque is the torque required to maintain the desired engine rotational speed and/or vehicle speed.

A desired cylinder air/fuel ratio is determined as represented by block 82. The current engine speed is then determined as represented by block 84. Block 86 represents determination of the intake manifold pressure. The burned gas fraction is then determined based on the engine speed, intake manifold pressure, and various other operating parameters which may depend upon the particular application.

A desired engine indicated torque is then determined as represented by block 90. Preferably, the indicated torque value corresponds to the desired engine brake torque adjusted for various losses. In one embodiment, the desired engine indicated torque is determined by subtracting frictional losses (which are a function of engine speed and temperature) from the desired engine brake torque. An airflow upper bound is then computed as represented by block 92 based on the current operating conditions. In one embodiment, the airflow upper bound represents the maximum amount of cylinder airflow that can be obtained for the current engine speed and intake manifold pressure. For variable cam timing applications, a minimal value of airflow may also be imposed as illustrated and described in greater detail with reference to FIG. 3.

The required fuel flow and airflow to deliver the desired engine indicated torque is then computed using an appropriate torque model as represented by block 94. Preferably, the desired fuel flow and airflow are determined with minimum deviation from MBT spark timing to obtain the desired engine torque value and the desired air/fuel ratio determined at step 82. In one embodiment, the desired values of air and fuel flow are determined on the basis of a torque model which assumes spark set to MBT in the form of:

$$T_i = a_0(N) \cdot W_{air} + a_1(N) \cdot W_f$$

where $T_i$ represents the indicated torque, $a_0$ and $a_1$ represent functions of N (engine speed), $W_{air}$ represents air flow and $W_f$ represents fuel flow.

A more complicated expression for the indicated torque may be utilized to provide increased accuracy if spark is not substantially near MBT. Various torque models or equations have been developed and published and may be adjusted for each particular application as appropriate. The resulting value for airflow determined by the appropriate torque model is compared to the airflow upper bound as represented by block 96. If the computed airflow does not exceed the upper bound, the computed airflow and fuel flow is used as represented by block 98 to control the appropriate actuators to deliver the airflow and fuel flow to the cylinders as represented by block 106. Actuators for airflow control may include a throttling device, such as a throttle valve, or control of intake and/or exhaust valves using a variable cam timing mechanism or electromagnetically actuated valves. Fuel flow actuators preferably include electronically actuated fuel injectors.

If the airflow computed by block 94 to deliver the required indicated torque exceeds the upper bound as determined by block 96, the airflow is set to the upper bound as indicated at block 100. A fuel flow upper bound is then computed as indicated by block 102. In one embodiment, the fuel flow upper bound corresponds to the maximum fuel with maximum air flow allowed by:

$$W_f^{max} = \frac{W_{air}^{max}}{R_1}$$

where $R_1$ is the minimum air/fuel ratio which provides stable combustion and/or acceptable emissions, depending upon the particular application. The required fuel flow is then computed using an appropriate torque model to achieve the indicated torque using the maximum airflow and a fuel flow which is less than or equal to the fuel flow upper bound. In one embodiment, the fuel flow expression may be represented by an equation of the form:

$$W_f = \min\left\{W_f^{max}, \frac{T_i - a_0(N) \cdot W_{air}^{max}}{a_1(N)}\right\}$$

where "min" represents selection of the minimum of the parenthetical expressions, $W_f$ represents the fuel flow, $W_f^{max}$ represents the fuel flow upper bound, $T_i$ represents engine indicated torque, N represents current engine speed, $W_{air}^{max}$ represents the airflow upper bound, and $a_0$, $a_1$ are appropriate application-specific functions which may have representative values stored in a look-up table, for example. The computed fuel flow of block 104 either achieves the desired indicated engine torque, or achieves the maximum torque possible from the engine for the current operating conditions for applications which do not include a secondary airflow control, i.e. variable valve timing (VVT) engines which do not include a secondary throttle.

The airflow and fuel flow determined by block 104 is then used by block 106 to control the appropriate actuators to deliver the airflow and fuel flow to the cylinders. Depending upon the particular application, airflow actuators may include controlling valve timing using a variable cam mechanism, variable valve timing electromagnetic actuators, etc. Fuel flow is preferably controlled by varying the pulse width of signals used to energize the fuel injectors.

Referring now to FIG. 3, a block diagram illustrating operation of an alternative embodiment of a system or method for transient torque control according to the present invention is shown. The required engine brake torque, cylinder air/fuel ratio, engine speed, and intake manifold pressure are determined as represented by blocks 120–126. Information gathered from various sensors is then used to determine the burned gas fraction as represented by block 128. A value representing the required engine indicated torque based on the engine brake torque and parasitic loads is determined as represented by block 130. Preferably, block 130 includes frictional losses of the engine which may vary according to engine speed and oil temperature, for example.

A system or method according to the embodiment illustrated in FIG. 3 preferably includes a secondary airflow control device, such as a throttle valve or plate, used in conjunction with a primary airflow control device, such as a variable cam timing mechanism. Block 132 then determines the upper and lower bounds for available airflow based on the current engine speed and intake manifold pressure. In applications utilizing a secondary airflow control device, block 132 determines available airflow based on the current setting or position of the secondary airflow control device. The air and fuel required to produce the desired indicated torque and air/fuel ratio are computed using an appropriate torque model as represented by block 134. Block 136 determines whether the computed airflow is between the upper and lower bounds computed by block 132. If within bounds, the desired airflow is set to the value determined by the torque model as represented by block 138. The primary airflow control device, such as the valve timing, is used to adjust the current airflow as represented by block 140 based on the desired airflow value. Injector pulse widths for one or more injectors are controlled to deliver the desired fuel flow calculated by the torque model in block 134.

If airflow is not within the upper and lower bounds calculated by block 132, block 142 determines whether the airflow is less than a minimum airflow. If so, block 144 sets the desired airflow to the minimum amount. Otherwise, block 146 sets the airflow to the maximum amount. Preferably, the airflow minimum and maximum amounts correspond to the lower and upper bounds, respectively, as determined by block 132.

Block 148 then determines corresponding lower and upper fuel bounds corresponding to the lower and upper bounds for the airflow and the desired air/fuel ratio. In general, bounds for fuel flow will be imposed when air flow is bounded for current operating conditions or operating mode. The reason for these bounds may vary depending on the application, operating mode and/or operating conditions. For example, when operating with stratified charge, the upper bound on fuel may be determined to inhibit soot formation and the lower bound may be determined to maintain combustion stability. However, at low speed and load conditions, the lower bound may be determined by injector characteristics.

Block 150 then computes the fuel flow necessary to deliver the indicated torque based on the minimum or maximum airflow. If the available indicated torque as determined by block 150 is less than the desired indicated torque, and the intake manifold pressure (P) is less than atmospheric pressure as determined by block 152, the secondary airflow device is adjusted as indicated by block 154 to further modify the available airflow. Otherwise, the calculated fuel flow and minimum or maximum airflow is used to control the valve timing and fuel injection as represented by blocks 140 and 156.

As such, the present invention provides a system and method for transient torque control in a direct injected spark ignition engine using the airflow and fuel flow as transient torque actuators rather than spark. As such, the present invention allows spark to be maintained substantially near MBT during transient torque control to avoid any associated fuel economy reduction.

While the best mode for carrying out the invention has been described in detail, those familiar with the art to which this invention relates will recognize various alternative designs and embodiments for practicing the invention as defined by the following claims.

What is claimed is:

1. A method for transient torque control on a direct injection spark ignition internal combustion engine, the method comprising:
   determining a desired value for engine torque based on current engine operating conditions;
   determining a desired value for cylinder air/fuel ratio based on current engine operating conditions;
   determining an air flow upper bound for currently available cylinder air flow based on current engine operating conditions;
   determining desired fuel flow and air flow values with minimum deviation from MBT spark timing to obtain the desired engine torque and air/fuel ratio values; and
   controlling at least one fuel flow actuator and at least one air flow without altering spark timing to deliver the desired cylinder fuel flow and the desired cylinder air flow if the desired cylinder air flow is less than the upper bound, and setting the desired cylinder air flow to the upper bound if the desired cylinder airflow exceeds the upper bound.

2. The method of claim 1 wherein the step of controlling comprises controlling an engine valve to deliver the desired cylinder air flow.

3. The method of claim 2 wherein the engine includes variable cam timing and wherein the step of controlling comprises modifying cam timing to deliver the desired cylinder air flow.

4. The method of claim 2 wherein the engine includes electromagnetic valve actuators and wherein the step of controlling comprises altering valve opening and/or closing using the electromagnetic valve actuators to deliver the desired cylinder air flow.

5. The method of claim 1 wherein the desired cylinder air flow exceeds the air flow upper bound, the method further comprising:
   determining a fuel upper bound based on the air flow upper bound and a minimum air/fuel ratio for stable combustion or emissions control;
   calculating a new value for desired fuel flow based on the air flow upper bound and the desired torque; and
   controlling the at least one fuel actuator to deliver the lesser of the fuel flow upper bound and the new value for desired fuel flow.

6. The method of claim 5 wherein the engine includes a throttle plate within an intake air passage to modify airflow and wherein the new value for the desired fuel flow exceeds the fuel upper bound, the method further comprising:
   increasing throttle plate opening to increase intake air flow when manifold pressure is less than atmospheric pressure.

7. The method of claim 1 wherein determining the air flow upper bound comprises determining the airflow upper bound based on current engine rotational speed and intake manifold pressure.

8. The method of claim 1 wherein the desired value for engine torque represents indicated engine torque.

9. The method of claim 1 wherein the engine includes a variable cam timing mechanism, the method further comprising:
    determining a cylinder air flow lower bound based on a minimum air flow which can be controlled using the variable cam timing mechanism; and
    wherein the step of controlling includes controlling the variable cam timing mechanism to deliver an airflow corresponding to the air flow lower bound if the desired air flow is less than or equal to the air flow lower bound.

10. The method of claim 1 wherein determining a desired value for engine torque comprises determining a desired value for engine torque to maintain a desired engine rotational speed.

11. The method of claim 1 wherein determining a desired value for engine torque comprises determining a desired value for engine torque to maintain a desired vehicle speed.

12. A method for controlling a throttleless direct injection spark ignition internal combustion engine to provide transient torque control, the method comprising:
    determining a desired value for engine output brake torque;
    determining a desired value for engine indicated torque based on the desired value for engine output brake torque and losses based on current engine operating conditions;
    determining a desired value for cylinder air/fuel ratio based on current engine operating conditions;
    determining an air flow upper bound for currently available cylinder air flow based on current engine speed and manifold pressure;
    determining desired fuel flow and air flow values with minimum deviation from MBT spark timing to obtain the desired value for engine indicated torque and air/fuel ratio;
    controlling at least one fuel actuator to deliver the desired fuel flow;
    controlling engine valve timing to deliver the desired cylinder air flow if the desired cylinder air flow is less than or equal to the air flow upper bound; and
    if the desired air flow exceeds the air flow upper bound:
        setting the desired cylinder air flow to the air flow upper bound;
        determining a fuel flow upper bound based on the air flow upper bound and a minimum air/fuel ratio associated with stable combustion or emissions control;
        determining a fuel flow required to produce the desired value for engine indicated torque based on the air flow upper bound; and
        controlling at least one actuator to deliver the lesser of the fuel flow required to produce the desired value for engine indicated torque and the fuel flow upper bound.

13. The method of claim 12 wherein the step of determining a desired value for engine output brake torque comprises:
    determining a desired engine idle speed; and
    determining the desired value for engine output brake torque to maintain the desired engine idle speed.

14. The method of claim 12 wherein the step of determining a desired value for engine output brake torque comprises:
    determining a desired vehicle speed based on a cruise control setting;
    determining the desired value for engine output brake torque to maintain the desired vehicle speed.

15. The method of claim 12 wherein determining a desired value for engine indicated torque comprises determining engine frictional losses based on current engine temperature and engine rotational speed.

16. A computer readable storage medium having stored data representing instructions executable by an engine controller to control a direct injection spark ignition internal combustion engine to provide transient torque control while maintaining spark timing at or near MBT, the computer readable storage medium comprising:
    instructions for determining a desired value for engine torque based on current engine operating conditions;
    instructions for determining a desired value for cylinder air/fuel ratio based on current engine operating conditions;
    instructions for determining an air flow upper bound for currently available cylinder air flow based on current engine rotational speed and manifold pressure;
    instructions for determining desired fuel flow and air flow values with minimum deviation on MBT spark timing to obtain the desired engine torque and air/fuel ratio values; and
    instructions for controlling at least one actuator without altering spark timing to deliver the desired cylinder air flow if the desired cylinder air flow is less than the upper bound, and setting the desired cylinder air flow to the upper bound if the desired cylinder airflow exceeds the upper bound.

17. The computer readable storage medium of claim 16 wherein the desired cylinder air flow exceeds the air flow upper bound, the computer readable storage medium further comprising:
    instructions for determining a fuel upper bound based on the air flow upper bound and a minimum air/fuel ratio for stable combustion or emissions control;
    instructions for calculating a new value for desired fuel flow based on the air flow upper bound and the desired torque; and
    instructions for controlling the fuel flow to deliver the lesser of the fuel flow upper bound and the new value for desired fuel flow.

18. The computer readable storage medium of claim 17 wherein the instructions for determining a desired value for engine torque comprise instructions for determining a desired value for engine torque to maintain a desired engine rotational speed.

19. The computer readable storage medium of claim 17 wherein the instructions for determining a desired value for engine torque comprise instructions for determining a desired value for engine torque based on a desired cruise control vehicle speed.

20. The computer readable storage medium of claim 16 wherein the engine includes a variable cam timing mechanism, the computer readable storage medium further comprising:
    instructions for determining a cylinder air flow lower bound based on a minimum air flow which can be controlled using the variable cam timing mechanism; and
    wherein the instructions for controlling include instructions for controlling the variable cam timing mechanism to deliver an airflow corresponding to the air flow lower bound if the desired air flow is less than or equal to the air flow lower bound.

* * * * *